(12) United States Patent
Monteix

(10) Patent No.: US 9,000,333 B2
(45) Date of Patent: Apr. 7, 2015

(54) HEATING INSTALLATION AND REFLECTING DEVICE FOR A HEATING INSTALLATION

(75) Inventor: Serge Monteix, Lyons (FR)

(73) Assignee: Speziallampenfabrik Dr. Fischer GmbH, Diez (DE)

( * ) Notice: Subject to any disclaimer, the term of this patent is extended or adjusted under 35 U.S.C. 154(b) by 484 days.

(21) Appl. No.: 13/497,305

(22) PCT Filed: Sep. 9, 2010

(86) PCT No.: PCT/IB2010/054062
§ 371 (c)(1),
(2), (4) Date: Jul. 9, 2012

(87) PCT Pub. No.: WO2011/036593
PCT Pub. Date: Mar. 31, 2011

(65) Prior Publication Data
US 2012/0267357 A1    Oct. 25, 2012

(30) Foreign Application Priority Data

Sep. 23, 2009    (EP) ..................................... 09305885

(51) Int. Cl.
| | |
|---|---|
| *F27B 5/14* | (2006.01) |
| *B29B 13/02* | (2006.01) |
| *B29C 49/64* | (2006.01) |
| *B29C 49/68* | (2006.01) |
| *B29C 49/06* | (2006.01) |
| *F26B 19/00* | (2006.01) |
| *B29C 35/08* | (2006.01) |
| *B29K 105/00* | (2006.01) |

(52) U.S. Cl.
CPC ........... *B29B 13/024* (2013.01); *B29C 49/6418* (2013.01); *B29C 49/6445* (2013.01); *B29C 49/68* (2013.01); *B29C 2035/0822* (2013.01); *B29K 2105/258* (2013.01); *B29C 49/06* (2013.01)

(58) Field of Classification Search
USPC .................. 219/390, 405, 411; 392/416, 418; 118/724, 725, 50.1
See application file for complete search history.

(56) References Cited

U.S. PATENT DOCUMENTS

| | | |
|---|---|---|
| 5,549,468 A | 8/1996 | Mitchell et al. |
| 6,361,301 B1 | 3/2002 | Scaglotti et al. |

FOREIGN PATENT DOCUMENTS

| | | |
|---|---|---|
| DE | 19724621 A1 | 12/1998 |
| EP | EU-0999724 A2 | 5/2000 |
| JP | 2002-100458 A | 4/2002 |

(Continued)

*Primary Examiner* — Shawntina Fuqua
(74) *Attorney, Agent, or Firm* — Panitch Schwarze Belisario & Nadel LLP

(57) ABSTRACT

The installation (10) is adapted for the heat treatment of objects, such as plastic preforms (17), and comprises a reflective device exhibiting a plurality of elongated and opened IR-reflective cavities stacked one onto the other according to a stacking axis and arranged to lodge elongated IR lamps (16) within, where the aperture of each cavity faces generally a main axis parallel to the stacking axis along which the object would be placed. The reflective device (20) further comprises protrusions separating the cavities one to the other and extending generally transversal/transverse to the stacking axis, the reflective device being made as at least one integral block of a heat-conductive material. The cavities may each comprise a curved bottom portion and two opposite side surfaces provided with respective longitudinal breaks of slope at a junction with the curved bottom.

19 Claims, 4 Drawing Sheets

(56) References Cited

FOREIGN PATENT DOCUMENTS

| WO | 0232652 | * | 4/2002 |
| WO | WO-02/32652 A1 | | 4/2002 |
| WO | 2008110630 | * | 9/2008 |
| WO | WO-2008/110630 A1 | | 9/2008 |

* cited by examiner

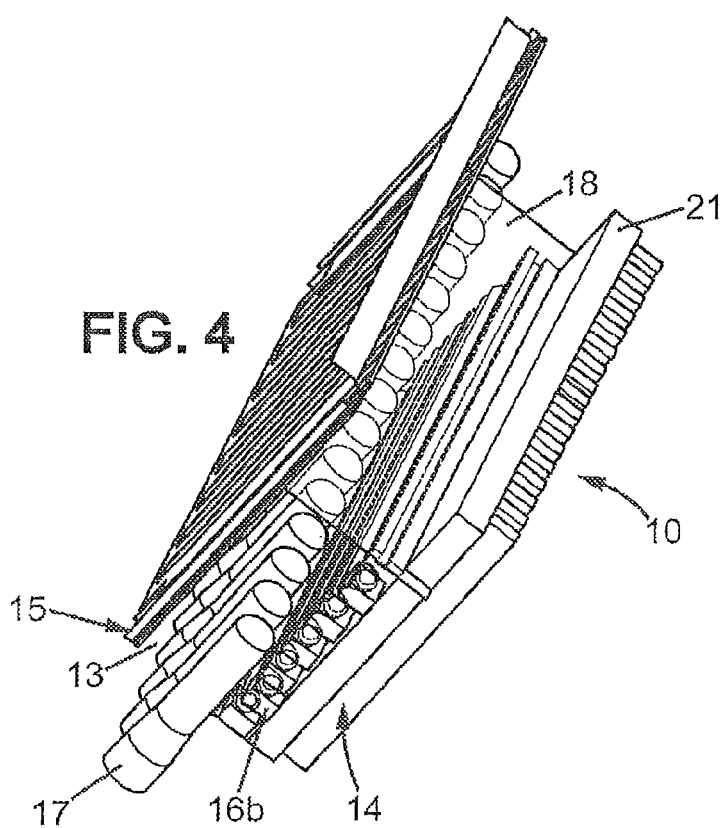
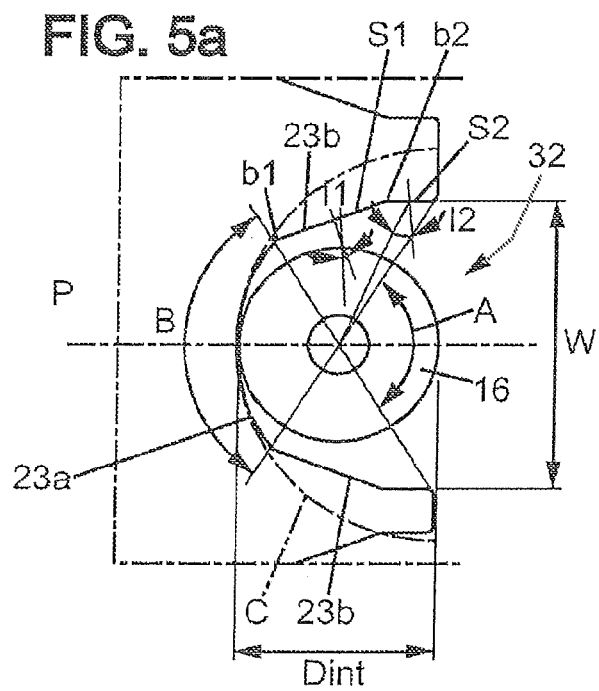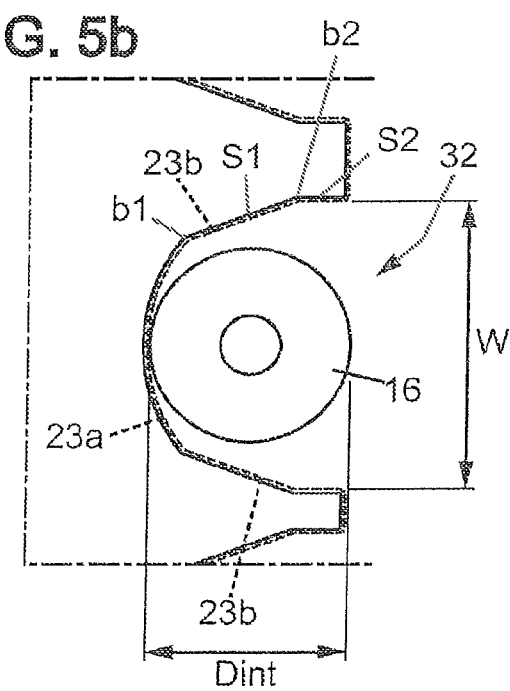

HEATING INSTALLATION AND REFLECTING DEVICE FOR A HEATING INSTALLATION

CROSS-REFERENCE TO RELATED APPLICATIONS

This application is a national stage application (under 35 U.S.C. §371) of PCT/IB2010/054062, filed Sep. 9, 2010, which claims benefit of European Patent Office application 09305885.7, filed Sep. 23, 2009.

FIELD OF THE INVENTION

The present invention relates generally to the heating of objects. It relates more particularly to a heating installation comprising a plurality of heating elements adapted to produce heating of objects, for instance heating of thermoplastic objects such as plastic preforms. The invention also concerns a reflector device adapted for assembling a plurality of heating elements.

BACKGROUND OF THE INVENTION

Conventional ovens and similar systems for heating an inedible object, for instance a thermoplastic preform intended for the manufacture of a container, are provided with a plurality of radiating lamps each provided with an optical reflector. The radiating lamps are typically linearly elongated infrared bulbs. Each bulb is arranged substantially horizontally and retained in position by clips or similar fixing elements which both hold the bulb at a desired position. The bulbs are also connected to a source of electrical power through such clips.

U.S. Pat. No. 5,549,468 discloses a construction of a heating lamp assembly with adjustably positionable clips for holding IR lamps and reflectors in stainless steel material arranged back to the lamps to direct the IR beams onto the preform. The reflectors each have a length approximating the length of the lamps and have an arcuate extent of about 200°. The preform is placed in a preform oven between two lateral walls facing each other, one of which includes the heating lamp assembly. The lamps are placed through adjustment of the positionable clips one above another so as to face the body of the preform.

In a known manner, the preform is heated on the move, its neck facing downward. Each preform is rotated about itself, around a vertical axis, so that the lamps radiate to the whole periphery of the preform body. The bottom of the oven is provided with protective means designed to form a heat shield capable of protecting the neck of the preform and of preventing it from deforming. The height of the heating lamp assembly is chosen in relation to the length of the body of the preform.

Thermoplastic container manufacturers presently seek to reduce as far as possible the inherent costs/charges associated with the operation of the machines for manufacturing these containers, and especially the consumption of electrical energy by these machines. Now, the preform-heating oven consumes most of the electrical energy in an installation for manufacturing thermoplastic containers. Consequently, any reduction, albeit a small one, in losses in the oven is reflected by an appreciable concomitant reduction in the consumption of electrical energy, and therefore in a financial saving and better profitability of the machine.

SUMMARY OF THE INVENTION

An object of the invention is therefore to meet this expectation of users and to provide means suitable for optimizing the efficiency in the heating installation, in order to reduce the consumption of electrical energy.

Embodiments of the present invention provide a heating installation for heating by infrared (IR) radiation objects essentially composed of a heat sensitive material, comprising a reflective device exhibiting a plurality of elongated and opened IR-reflective cavities stacked one onto the other according to a stacking axis and arranged to lodge elongated IR lamps within, where the aperture of each cavity faces generally a main axis parallel to the stacking axis along which the object would be placed, wherein the reflective device further comprises protrusions separating the cavities one to the other and extending generally transversal to the stacking axis, and wherein the reflective device is made as at least one integral block of at least one heat-conductive material.

The installation may be integrally made and be accordingly easier to manufacture (e.g. by molding).

Furthermore the integrality (obtained for example by molding) of the reflective device allows to obtain new designs of the optical reflectors and therefore new thermal effects on the object to heat. For example, one can provide contiguous and/or inclined cavities and/or gradual or different distances (or steps) between the reflective cavities. It is also easier to tailor the optical design according to thermal profile needs.

Moreover such installation is less cumbersome since there is no necessity to use casings around and between the cavities.

Integrality of the reflective device may help for the maintenance of the installation. One can use for example pyrolyse/pyrolitic heating to clean-up the reflective surfaces from any plastic elements projected from the object made of a plastic material, when the latter is heated.

Protrusions avoid some interferences between light emitted in each cavity, and therefore avoids some problems of double reflections. The light emitted is therefore better controlled.

Optionally, each of said cavities comprises a curved bottom portion joining two opposite side surfaces at a respective longitudinal break of slope. At each break of slope of said cavity, the angle of the corresponding side surface with respect to the median plane of the cavity is lower than the angle of the tangent of the curved bottom portion with respect to the median plane.

The "median plane" of a cavity is defined from the volume and geometry of the cavity. The volume of a cavity is limited on the one hand by the inner walls (including the curved bottom portion and the opposite side surfaces) of the cavity and on the other hand by the surface of the cavity aperture. The median plane:
  goes through the point(s) of the curved bottom portion which is (are) the most remote point from the aperture surface;
  splits the volume of the cavity in two equal parts.

Optionally, the angle ($\theta$) of at least one side surface with respect to the median plane, at the break of slope, is in the range between 10 and 30°.

Optionally, at least one of said side surfaces is flat. But the side surfaces may be of other shapes (e.g. curved with a radius of curvature lower than the curved bottom surface). Two planar faces facing with each other are preferably provided. As the curved bottom portion may be typically formed with a radius of curvature substantially equal or close to the perfect half-cylinder that would define a perfect reflector, the configuration of the planar surfaces maximizes the level of radiation reflected toward the object to be heated. Nevertheless other shapes may be chosen for the bottom curved portion, such as for example a parabolic shape or an intermediate curved portion comprised between a cylindrical portion and a parabolic portion.

Due to this specific arrangement of the cavities, the heating installation is further compact. In particular, the apertures of the cavities are narrower and the lamps are closer to each other, while the optical system still prevents from interferences between beams and thermal issues and allows a good maintenance of the heating installation.

Moreover, this configuration allows to maximize the light outputting each cavity towards the object to heat and therefore the efficiency of each cavity (less energy loss, decrease of double reflections onto the lamps and optical interferences with other cavities).

Optionally, the said heat-conductive material is made of a ceramic. This material is a dense material such that thin elements may be provided in the reflective device (e.g. the protrusions). This material is also an excellent heat-conductor and has a high thermal resistance. This material is also easier to make than other heat-conductive materials (e.g. aluminum) in industrial manufacturing processes (e.g. machining, molding, extrusion) and it is therefore possible and easier to design new optical profiles for the reflective device.

Optionally, the inner volume of each cavity has a longitudinal centre/center line along which an IR lamp can be lodged, and the reflective device comprises:
a first end provided with two of said reflectors; and
a second end at the opposite of the first end, provided with two of said reflectors;
wherein the distance between the centre/center lines in the first end is shorter than the distance between the centre/center lines in the second end.

By virtue of this arrangement, the superposition of the two reflectors of the first end is more compact than the superposition of the two reflectors of the second end, whereby radiating of the heating installation may be specifically concentrated on the first end side to obtain the appropriate heating profile, with typically a higher temperature at one end of the body to be heated. As a result, in comparison with a conventional construction of a heating lamp assembly, for a same heating operation, power of one or several radiating lamps may be reduced and/or the total number of lamps may be reduced. It should be observed that this arrangement may be implemented with various forms for the cavities.

According to another feature, at least two of the cavities are arranged in a different manner so as to direct the lamp's radiant output around respective main directions that are not parallel. Such a dissymmetric/non-symmetric arrangement is adapted to increase irradiation according to the desired heating profile and to reduce losses.

According to a specific feature, each of said cavities comprises:
two opposite side surfaces;
a curved bottom allowing a corresponding lamp to be arranged parallel to said bottom surface of the support member, said curved bottom being optionally in a continuous longitudinal contact with the corresponding outer bulb of the lamp; and
an aperture with a determined width corresponding to the spacing between the two opposite side surfaces.

According to another feature, for a majority of the reflectors, the ratio between the diameter of the virtual cylinder located in the interior volume that can be lodged in the interior volume of each cavity and said determined width is in the range between 0.6 and 0.9. With such a configuration, a compromise may be obtained for an improved heating through a more precise focalization, adapted to the heating profile.

In various embodiments of the heating installation of the invention, recourse may optionally also be had to one or more of the following dispositions:
the heating installation comprises a support member having a bottom surface fixed to the side of the reflective device opposite to said apertures;
at least the cavity located at the lowermost level is upwardly inclined so that the main direction of the beam outputting the cavity through the corresponding aperture is orientated with an angle comprised between 12 and 25° relative to a plane perpendicular to said stacking axis;
at least the cavity located at the uppermost level is downwardly inclined so that the main direction of the beam outputting the cavity through the corresponding aperture is orientated with an angle comprised between 5 and 15° relative to a plane perpendicular to said stacking axis;
the heating installation adapted for use in an oven of a blow molding machine for heating plastic preforms prior to blow molding, the heating installation comprising two elongated lateral walls, at least one of which comprises the reflective device, the lateral walls facing each other a certain distance apart, between which a preform to be heated can be moved along a defined path, so that the preform moved longitudinally between said lateral walls is subjected to a predetermined heating profile.

According to another feature, the reflecting device may comprise a plurality of reflector modules that can be directly stacked according to the stacking direction to integrally form the reflective device, each of the reflector modules comprising at least one attachment element on a face that extends transversally/transversely relative to the general stacking direction, wherein the attachment elements are adapted to permit removable stacking between two adjacent reflector modules and orientation of the apertures of the reflector modules toward a same side so as to define a continuous reflective face. This construction advantageously provides more flexibility since one or more of the reflector modules, which are used when the object to be heated has a long size, may be removed when the object to be heated has a short size. For example, preforms for conception of a 0.5 L plastic bottle may be obtained with a reflective device having only one main reflector module, the other reflector modules being extensions of this main reflector module. The distance between the centre lines in such main reflector module is for example the shortest, at least at the opposite of the extensions.

Other features and advantages of the invention will become apparent to those skilled in the art during the description which will follow, given by way of a non-limiting example, with reference to the appended drawings.

BRIEF DESCRIPTION OF THE DRAWINGS

FIG. 4 shows a perspective view of a heating installation in accordance with the first embodiment of the invention;

FIG. 5a shows a section view of one the reflectors of the reflective device shown in FIG. 3 and FIG. 5b shows a similar section view in another embodiment of the reflective device in accordance with the invention;

DETAILED DESCRIPTION OF EMBODIMENTS

In the various figures, the same references are used to designate identical or similar elements.

Figure 1:
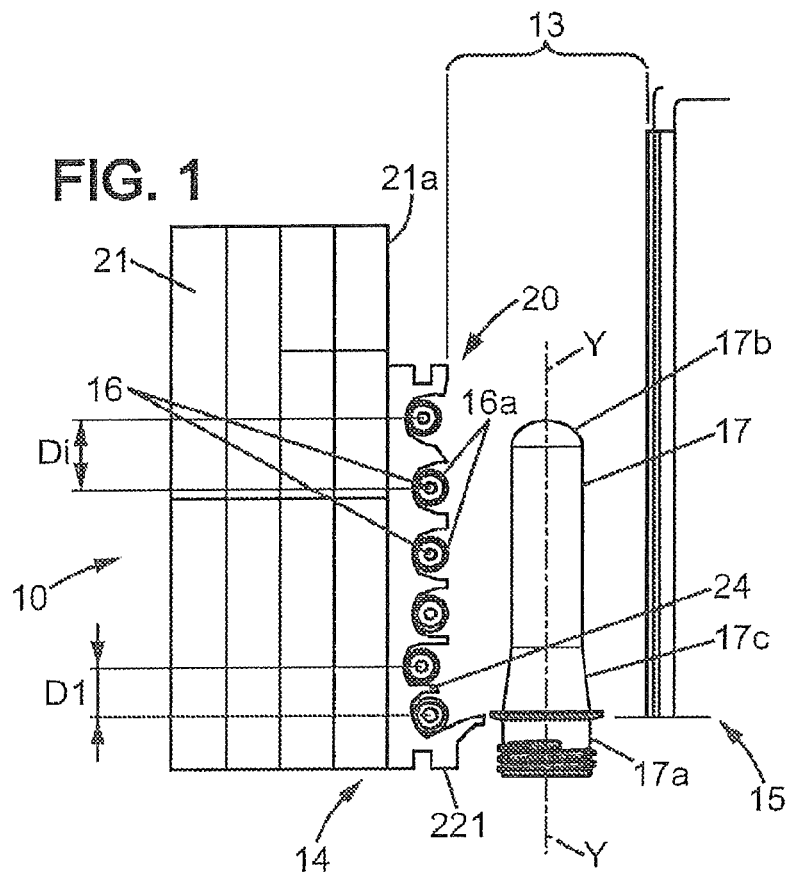
FIG. 1 shows a side view of a heating installation in accordance with a first embodiment of the invention.

A heating installation 10 in accordance with a first embodiment of the invention is depicted in FIGS. 1 to 5. Referring to FIGS. 1 and 4, the installation may be all or part of an oven. The oven is arranged with a gap 13 between the two lateral walls 14, 15. A first wall 14 of the lateral walls is provided with radiating sources, here lamps 16 each having a tubular outer bulb 16a. IR halogen lamps may be used. In the non-limitative example of FIGS. 1 and 4, preforms 17 are moved along a path crossing said gap 13. The preforms 17 are here placed with their necks 17a down. Alternatively, any other heat-sensitive objects may be treated through the installation 10. For instance and in non-limitative manner, the heating installation 10 may be used for any pre-heating application, any heat processing for plastics, heat shrinkage of packaging and may also be used as ovens for semi-conductor, paper, emulsion, latex and man-made fibre applications.

In the non-limitative example of FIGS. 1 and 4, the heating installation 10 is adapted for use in an oven of a blow molding machine for heating plastic preforms 17 prior to blow molding. The lateral walls 14, 15 of the heating installation 10 are elongated and are facing each other a certain distance apart. Preforms 17 thus can be heated when moving within the gap 13, along a defined path. Each preform 17 is moved longitudinally between the lateral walls 14, 15, typically with a rotation around its axis YY. The preform 17 is subjected to a predetermined heating profile in a short time.

The gap 13 may be partly be closed, beyond the closed end 17b of the preform 17 on the path and near said closed end 17b, here above the closed end 17b, so that at least some of the radiation emitted beyond the closed end 17b of the preform 17 is reflected toward the body 17c of the preform 17. Thereby, the losses due to lost radiation are limited. A transverse plate 18 may be removably mounted on one of the lateral walls 14, 15 of the oven for this purpose. A passage for ventilation, preventing the oven from overheating, may be also provided. In FIG. 4, the transverse plate 18 is attached to the first lateral wall 14.

Still referring to FIGS. 1 and 4, the first wall 14 is provided with an elongated reflective device 20 that extends along the path, with a length significantly higher (for instance at least four times higher) than an average diameter or similar characteristic dimension of the transversal section in the objects to be heated, here the horizontal section of the plastic preforms 17. The reflective device 20 may extend between the transverse plate 18 and an opposite level corresponding to the neck 17a of the preform 17.

As shown in FIGS. 1-4, the first lateral wall 14 of the heating installation 10 comprises a support member 21 having a bottom surface 21a. The reflective device 20 is maintained between the bottom surface 21 and the lamps 16 by a fixation system with a lower support element 22a, an upper element 22b and a plurality of lateral elements 22c that do not cover lateral apertures 20a, 20b of the reflective device 20. Here, the reflective device 20 is entirely separable from the support member 21, which may be made of one piece, and is supported by the support member 21. Alternatively in a less preferred embodiment, all or part of the reflective device 20 may be integral with the support member 21.

Here, the lamps 16 have a tubular outer bulb 16a of cylindrical shape. The lamps 16 thus have a longitudinal axis and may be positioned one above the other, with a distance between the respective lamps 16. The outer bulb 16b of each lamp 16 is received in the interior volume of a cavity defined by an elongated reflector 23 curved in cross-section and having here a U-shape. Wording "received in the interior volume" of course means that such an interior volume may entirely or almost entirely receive the corresponding tubular irradiating portion of the lamp 16. It is thus understood that the tubular outer bulb 16b may be housed in a corresponding curved reflector so that focalization is adapted, with preferably no gap between the lamp 16 and a curved bottom of the reflector cavity.

The reflective device 20 comprises a plurality of such elongated reflectors 23 and the corresponding cavities are directly superposed according to a general stacking direction, here a stacking axis which is vertical. Each lamp 16 is thus arranged relative to a corresponding reflector 23, so that one half of the outer bulb 16a faces the body 17c of the preform 17. The other half of the outer bulb 16a faces a bottom 23a, which is preferably concave, of the reflector 23. Here the bottom 23a is parabolic and receives about a third of the radiation of the lamp 16. In FIG. 5a, the corresponding angular portion has an angle B equal to 122°. In the first embodiment, the outer bulb 16a is in contact with said bottom 23a. Alternatively, a small gap may separate the bottom 23a from the outer bulb 16a. Also, the U-shape of the reflector 23 may be replaced by a W-shape or similar suitable shapes in all or part of the reflectors 23 of the reflecting device 20. More generally, it is understood that each cavity defined by a reflector 23 is provided with a bottom 23a and two opposite side surfaces 23b extending from the bottom 23a. The inner reflecting surface of the reflectors 23, which is preferably U-shaped, thus extends from the distal bottom 23a near the support member 21 as far as a proximal face that has a frontal opening delimited by two longitudinal edges. Two side openings are also provided for each of the reflectors 23, so that ends of the lamps 16 protrude relative to the reflective device 20. These ends are typically used for the fixing of the lamps 16.

The lamps 16 may be provided with end caps 16b fixed, for instance by means of cement, to the support member 21. More generally, any suitable way of fixing may be used to fix the lamps 16 directly or indirectly to the support member 21, for example trough lateral slots (not shown) of the support member 21, and/or to the reflective device 20. The reflective device 20 may be held in position through fixing of the lamps 16 to the support member 21.

Figure 2:
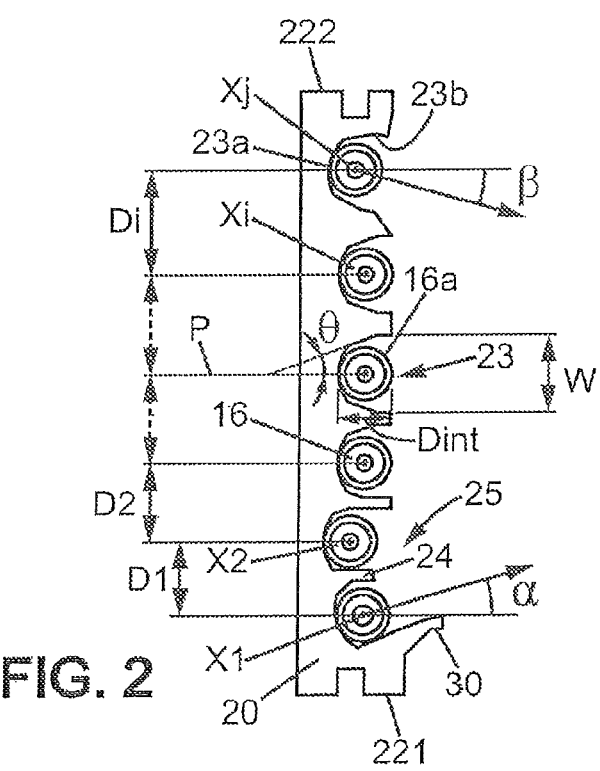
FIG. 2 shows the reflective device used in the heating installation of FIG. 1.
Figure 3:
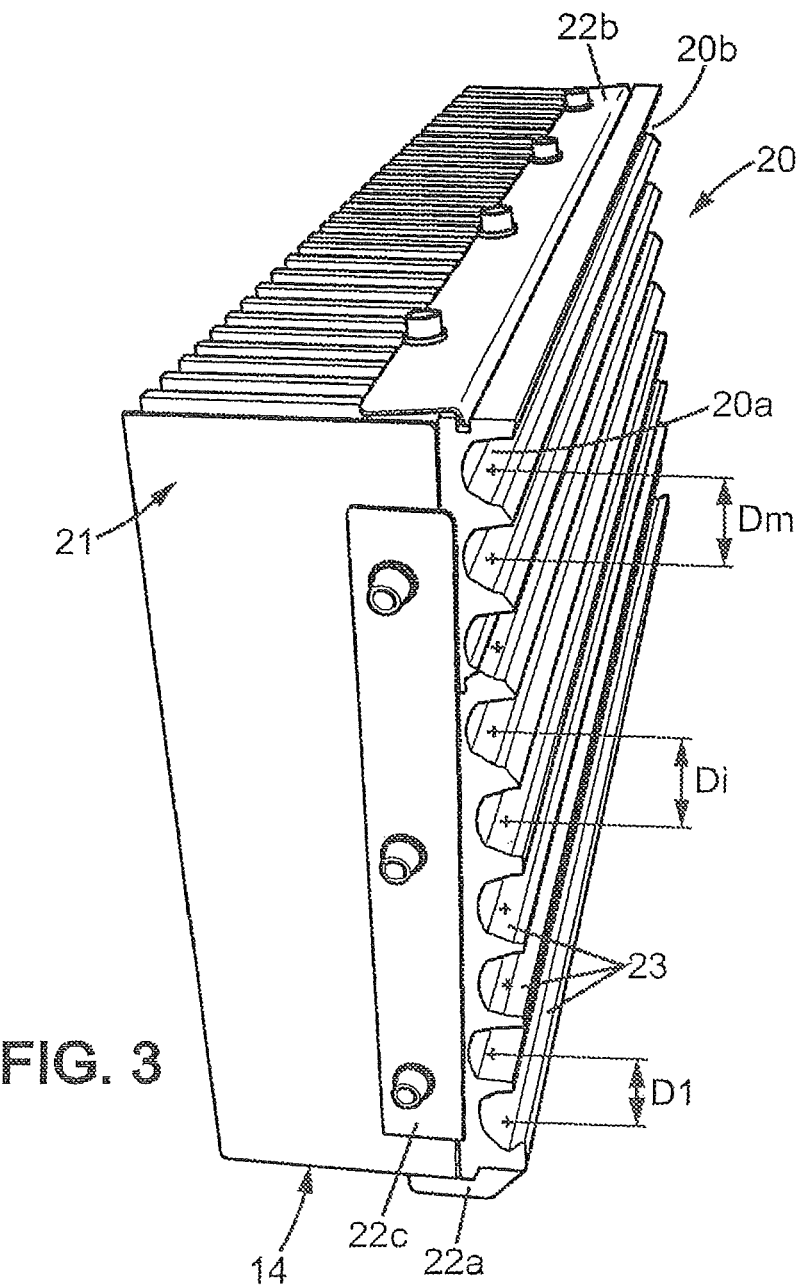
FIG. 3 shows a perspective view of a reflective device fixed to a support member in accordance with the first embodiment of the invention.

As shown in FIGS. 1-4, each cavity aperture is orientated at the opposite of the bottom surface so as to define a continuous reflective face. The interior volume of each elongated cavity defined by a reflector 23 has a longitudinal centre line X1, X2, Xi, Xj which may correspond to the longitudinal axis of the lamp vessel. The reflective device 20 has reflectors 23 that are not identical. The two reflectors 23 of a first end 221 of the reflective device 20, here the lower end, are superposed in a more compact manner than the other reflectors. As shown in FIGS. 2-3 in particular, the distance D1 between the centre lines of these two cavities of the first end 221 is the shortest. At the second end 222, the distance Di, may be the longest. Such a configuration enables a concentration of the heating of the preform 17 in the part of the body 17c near the neck 17a, while the losses due to lost radiation are limited at the level corresponding to the closed end 17b of the preform 17.

More generally, a specific heating profile may be obtained for the heating or pre-heating of objects. For instance, objects having a dissymmetry between two opposite ends may be heated with one end that is more heated than the other.

Figure 6:
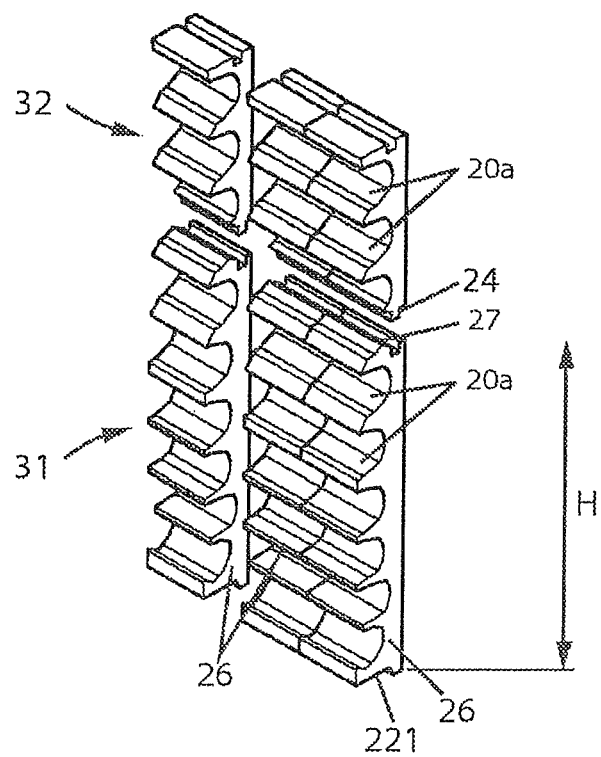
FIG. 6 is an exploded perspective view of the reflector modules forming a reflective device in accordance with a second embodiment of the invention.

In the first embodiment shown in FIGS. 1-5 as well as in the second embodiment shown in FIG. 6, the reflective device 20 is provided with a first end 221 adapted to protect one end of the object, in order to prevent heating of this end of the object. Referring to FIGS. 1-2 and 4, the neck 17a of the preform 17 corresponds to such end and may be protected by a reflecting wall extension 30 that extends close to the preform 17 at the junction between the body 17c and the neck 17a. The reflecting surface of the reflecting wall extension 30 may be flat and upwardly inclined to direct radiation of the lower lamp 16 only toward the body 17c of the preform 17, even if this lower lamp 16 is partly arranged at a lower level than said body 17c.

The reflecting wall extension 30 protrudes from the rest of the reflecting device 20 and is made of ceramic or similar material. As seen in FIG. 2, orientation of the curved bottom 23a of the lower cavity limits first lamp radiation toward the reflecting wall extension 30. Also, set back of the second lamp above the first lamp limits second lamp radiation toward the reflecting wall extension 30. As a result, this reflecting wall extension 30 may function as a radiation shield protecting the preform neck 17a and, thanks to its high temperature resistance and the particular positioning of the two lamps 16 in the cavity 25, can be deprived from a water cooling system or the like.

Due to the temperature of the lamps 16 in operation, the reflective material is a heat-conductor material chosen to resist to temperatures higher than 600° C. and for instance higher than 700° C. Accordingly, the reflective material may have a melting temperature higher than 600° C. and may be chosen to have a high near infrared reflectivity. Preferably, the total near infrared reflectivity is higher than 85%. It is understood that with such a high near infrared reflectivity, the reflective surface is maintained in its domain of temperature, despite the high thermal constraint applied by the lamp. This preserves the characteristics of the reflective surface along the lamp lifetime. The combination of the reflective material presenting a high diffuse reflectivity and each distance between lamps 16 insures a high covering of lamps 16 insuring then a uniform heat distribution over the product to be heated once all lamps 16 have the same input. The reflective device 20 may be integrally formed of the reflective material. Alternatively, only the surface that is close to the tubular outer bulb 16a may be coated with such a material, as shown in FIG. 5b. Ceramic material or other similar heat-conductor material may be used for this purpose, for example material in alumina or such material having high reflectivity (>90%) and high conductivity (>20 W/mK). The choice for a very high reflective material having a high conductivity will permit to be able to cool down either the outer bulbs 16b of lamps 16, either the inside of the system or its own temperature. This cooling could be then insured by several (combined or not) means:

forced air ventilation directly over the back side of this reflective device; some fins (vertical or horizontal) could be integrated in the design of the back reflective design; conduction by the contact with a heat sink.

When the lamps 16 are each in contact with the corresponding reflector 23 of the reflective device 20, as shown in FIGS. 1-2 and 4-5, the first lateral wall 14 may be placed closer from the objects to be heated, thus increasing efficiency of the heating operation. Indeed, as the reflectors 23 are close to the lamps 16, a higher heat flux concentration over the preform 17 or similar object to be heated is obtained and the oven confinement is increased without losing the controllability of the heat flux distribution along the preform height.

According to the first embodiment shown in FIGS. 1-4, at least two of the reflector cavities are arranged in a different manner so as to direct the lamp's radiant output around respective main directions that are not parallel. For instance as shown in FIG. 2, one or more of the cavities located at the lowermost level, here at the first end 221, are upwardly inclined so that the median/central direction of the beam transmitted at the opposite of the bottom surface 21a through the corresponding aperture is orientated with an angle α comprised between 12 and 25° (for example about 18°) relative to a plane perpendicular to the stacking direction. At the uppermost level, here at the second end 222, at least one of the reflector cavities is downwardly inclined so that the central direction of the beam transmitted at the opposite of the bottom surface through the corresponding aperture is orientated with an angle β comprised between 5 and 15° (for example about 10°) relative to a plane perpendicular to the stacking direction.

In a process for heating preforms 17, the design of some of the reflectors 23 at the back of the lamps 16 thus allows directing the radiation, for example IR, around a main direction that is not perpendicular to the preform axis YY, such that the radiation coming from the lamps 16 housed by these specific primary reflectors will, together with the radiation coming from the other lamps 16, heat a surface of the body 17c of the preform 17 according to a determined temperature profile. These specific back-reflectors are preferably at least the reflectors 23 located at the respective ends 221, 222. In the non-limitative illustrated embodiments, the shapes in cross-section of these reflectors 23 are each asymmetric with respect to any plane perpendicular to the preform axis YY.

In the illustrated first embodiment of the reflective device 20, the elongated cavities defined by the respective reflectors 23 have specific orientations, shapes and sizes, adapted to reduce the losses due to radiation lost. In other words, the central beam is adequately oriented and radiation around this central beam is reduced to increase focalization.

It is understood that no casing is needed between two adjacent cavities, which are thus contiguous. The partitioning walls or protrusions separating the cavities and defining the respective side walls 23b advantageously vary in height, and in shape, in order to avoid as much as possible a second reflection on the lamp 16. The variation of the thickness and the design of these partitioning walls are defined by the profile of the reflective device 20. Ceramic may be a suitable material, allowing the manufacturing of the reflective device 20 integrally with this specific profile.

As shown in FIGS. 1-3, the partitioning wall 24 located at the lowermost level, between the two lamps 16 having the smallest distance D1 between their centre lines X1, X2, is arranged inside a larger cavity 25 where the two outer bulbs 16 of said lamps 16 are received. In other words, the larger cavity 25 is defined by the two lower reflectors 23. The partition wall 24 is preferably of lower height than the other partitioning walls so that said partition wall 24 and the outer bulb 16 located above this partition wall 24 are rearward positioned relative to the outer bulbs 16a of the two adjacent lamps 16. The set back of the second lamp from the rest of the lamps 16, as shown in FIG. 2, contributes to a better control of the heat flux distribution along the preform height. Even for the upper lamp 16, a good focalization is obtained, in order to decrease the losses over the preform closed end 17b.

As shown in FIG. 5a for one of the reflector cavities of the reflective device 20, direct radiation may be limited at an angle A comprised between 105 and 125°, for instance about 116°. This may be the case for all or part of the reflector cavities. This corresponds to an advantageous compromise to reduce the gap between the lamps 16, while maximizing the aperture in order to prevent absorption by the reflector 23 itself (the flared profile avoiding internal multiple reflexions). The optical system is thus compact and adapted for integration of a plurality of lamps 16 that all face the object to be heated. If the height of a preform 17 is comprised between 10 and 25 cm, the lamps 16 associated with the reflective device 20 may only extend according to a height in the same order. Compactness of the optical system is thus advantageous to obtain a good heating profile while minimizing consumption of electrical energy.

Here, the bottom 23*a* is curved and joins each of the two opposite side surfaces at a respective longitudinal break of slope. In this non-limitative example, the bottom 23*a* has a determined radius of curvature bigger than that of the corresponding outer bulb 16*a* and is in a continuous longitudinal contact with the outer bulb 16*a*. It is thus understood that radius of curvature of the bottom 23*a* may be much bigger, for example more than twice, than the maximal width of the corresponding cavity (here at the aperture). As shown in FIG. 5A, the radius of curvature of the bottom 23*a* of the reflector cavity may be close or equal to that of the half-cylinder C that would define a reflector having a diameter equal to the radius of the lamp 16. Here, the two opposite side surfaces 23*b* are each provided with a planar surface or slope S1 that extends from the curved bottom 23*a*, at respective breaks of slope b1.

Referring to FIGS. 2 and 5*a*, such a planar surface defines an angle θ in the range between 10 and 30° relative to a cavity median plane P that is longitudinally secant with the curved bottom. This angle may be about 20° to efficiently reduce extension of the corresponding cavity according to the stacking axis. Of course, the cavity could be provided with another configuration, for example with only one break of slope b1. As a result of such a compact configuration, and in an non-limitative example, the distance between the lamps 16 may be comprised between 14 mm and 19 mm when the lamps 16 have a radius of about 5 mm. Furthermore, the robustness of the protrusions that separate the cavities is increased and a better protection is obtained for the lamps 16 that are each received in the interior volume of the corresponding cavity.

The spacing between the two opposite side surfaces 23*b* does not increase as much as in a parabolic reflector. The variation in the spacing toward the aperture, which essentially depends on said longitudinal breaks of slope, is thus reduced for the side walls 23*b*, in order to better reflect radiation toward the object to be heated and less toward the lamp 16. Two breaks of slope b1, b2 may be provided for this purpose, with similar angles inferior at 40°, the first break b1 being about three or four times deeper (i.e. distant from the cavity aperture) than the second break b2. With such a ratio comprised between 3:1 and 4:1, and provided that the first break b1 is located deeper than the axis of the lamp 16 in the corresponding reflector cavity, the angle of incidence I1 for the average radiation on the first slope S1 may be slightly higher than 15°, for example 17°, while the angle of incidence I2 for the average radiation on the second slope S2 may be about 30°.

For a majority of the reflector cavities, and preferably all the reflector cavities, the ratio between the diameter Dint of the bigger virtual cylinder located in the interior volume and width W of the cavity aperture is comprised between 0.6 and 0.9. Here, the diameter Dint substantially corresponds to the diameter of the outer bulb 16*a*. For two of the reflector cavities located at the first end 221, the ratio between width of the outer bulb and said determined width is comprised between 0.6 and 0.9, preferably between 0.7 and 0.9.

It is understood that the cavities of the elongated reflectors 23 are not parabolic because the side surfaces 23*b* are preferably made of one or more planar surfaces. The interior volume defined by the respective reflectors 23 is sized to entirely receive one tubular outer bulb 16*a* of a lamp 16. This configuration thus prevents reflection in a direction too divergent compared to the main direction of the radiation. As a result, indirect radiation may have a much higher contribution, resulting in a higher level of radiation. One advantage of a reflective device 20, so adapted according to the specific heating profile and having such a level of radiation, is that power of one or several radiating lamps 16 may be reduced and/or the total number of lamps 16 may be reduced in the heating installation 10.

Each reflector 23 may act as a heat sink. As a result, lamps with additional filters and/or lamps with higher power may be used. The second lateral wall 15 also comprises reflecting means, for instance flat as shown in FIGS. 1 and 4. It is also possible to use a complementary reflective device that is similar or identical to the reflective device 20 in the second lateral wall 15. This may concentrate the radiation in a smaller area at the level of each lamp 16, while losses are reduced near the upper and lower ends of the optical system.

In the first embodiment, two adjacent reflectors 23 are, directly, physically secured one to another and a same elongated piece defines several reflectors 23. Alternatively in a second embodiment as shown in FIG. 6, one or more of the elongated reflectors 23 may be an assembly of short identical pieces of reflector 26. As the pieces of reflector 26 have the same cross-section, the elongated reflectors 23 are obtained by assembling the pieces of reflector 26. Here, the pieces of reflector 26 are assembled side by side according to a longitudinal direction and maintained between the lateral elements 22*c* of the fixation system shown in FIG. 3 to obtain a continuous reflecting surface. In a non-limitative manner, the longitudinal dimension of the reflective device 20 as assembled in the first lateral wall 14 may be superior to 250-300 mm, while the pieces of reflector 26 have a corresponding dimension of 45 mm each for example. Thanks to this feature, the elementary pieces of reflector 26 may be obtained with a most acceptable tolerance at a lower price, whereby the whole cavity associating these pieces of reflector 26 may be easily obtained. Furthermore, it is easier for the elongated reflector 23 to expand and resistance of the reflective device 20 thus increases.

Accordingly, the reflective device 20 may be integral or made of elongated reflector modules M1, M2 and the reflector modules may be integral or made of short pieces of reflector 26. In the first option, the reflective device 20 may comprise one or two single pieces. Each of these single pieces defines an elongated reflector module that comprises at least two reflectors 23 in a more compact superposition at the first end 221 side, an intermediary portion with one or more reflectors 23 between the first end 221 and the second end 222, and at least two reflectors 23 in a less compact superposition at the second end 222. Of course, the module M2 may be an extension that is only used when the object to be heated is longer, the closed end 17*b* being higher in the non-limitative example of a heating of preforms 17.

In the second option, more flexible, each module M1, M2 is integral and comprises at least one cavity and at least one of said protrusions or partitioning walls. The modules M1, M2 may be fixed one to the other by fixing means on a bearing thermally conductive back board (cooling plate, located on the back of the modules M1, M2). In an additional option, some guiding means provided at the interface of the modules M1, M2 help the assembling of the system. For example, association of a rib with a slot or groove may be provided on the edge of the neighboured modules M1, M2.

In latter option, it is understood that the reflector modules M1, M2 can be directly superposed according to the general stacking direction to integrally form the reflective device 20, using any suitable attachment element. The distance Dm defined in the reflector module M2 and shown in FIG. 3 may be the longest for the whole reflective device 20 or may be equal to the distance Di, which is here the maximal distance between the centre lines in the reflector module M1. In the non-limitative example shown in FIG. 6, the attachment element 27 of the reflector module M1 is provided on a face that extends transversally relative to the general stacking direction and may engage a corresponding attachment element 28 of the reflector module M2. Here, the attachment elements 27, 28 are adapted to permit removable superposition between two adjacent reflector modules. In the reflective device 20 assembled with such reflector modules, orientation of the apertures is the same so as to define a continuous reflective face, with elongated continuous cavities.

In the second embodiment shown in FIG. 6, the modules M1, M2 are made of pieces of reflector 26 each having elementary reflectors 23e. In this second embodiment, the first module M1 that comprises the first end 221 of the reflective device 20 has a height, which is the same as height H of each of the constitutive pieces of reflectors 26. Here theses pieces of reflector 26 are short but any sizes can be used. The height H of the pieces of reflector 25, which extends according to the staking direction, may be longer than one, and preferably two, of the other dimensions. Thus, according to a first axis and to a second axis, each perpendicular to the stacking direction, dimensions of the piece of reflector 26 may be advantageously minimized, in order to insure an automatic production with optimized cost.

Figure 7A:
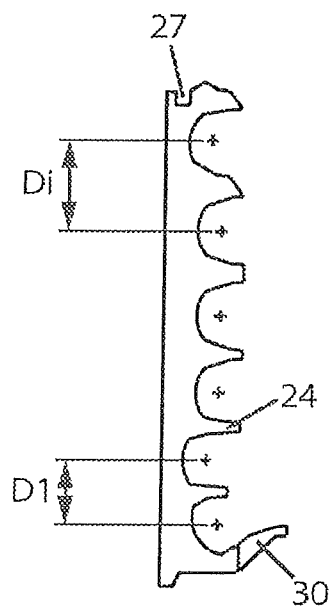
FIG. 7a shows a first option usable with the second embodiment and FIG. 7b shows a second option usable with the second embodiment.

In the second embodiment shown in FIG. 6, the pieces of reflector 26 are not made integral with the reflecting wall extension 30. However such a reflecting wall extension 30 may be inserted and fixed by a suitable assembling device. FIG. 7a illustrates a first option to adapt on the assembly of reflector modules M1 a reflecting wall extension 30, which may be attached by the lower side and the lateral sides of the first lateral wall 14. In this case, the reflecting wall extension 30 is arranged in a same way as in the first embodiment and the reflection associated to the first lamp (shown with a dotted line in FIG. 7a) is thus the same as in FIGS. 1-2.

Figure 7B:
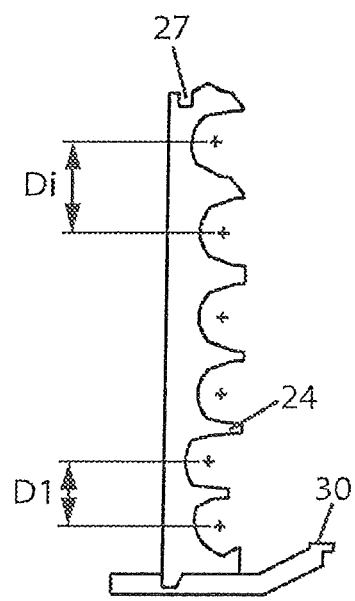

FIG. 7b shows a variant, in which the reflecting wall extension 30 is a piece of ceramic material or the like, which extends under the lowermost U-shaped reflector 23. The reflecting wall extension 30 is thus at a higher distance from the first lamp 16, compared with embodiment of FIG. 7a.

The present invention has been described in connection with the preferred embodiments. These embodiments, however, are merely for example and the invention is not restricted thereto. It will be understood by those skilled in the art that other variations and modifications can easily be made within the scope of the invention as defined by the appended claims, thus it is only intended that the present invention be limited by the following claims. For instance, the invention may be implemented in any machine intended to heat an object, with any possible elongated form for the heating elements. Although dimensions of the heating elements/lamps are preferably the same, heating lamps 16 having different kinds of tubular outer bulb 16a may be used in the heating installation 10.

Furthermore, the reflector cavities may have any suitable shape, for example an identical near parabolic shape, for a majority of the reflectors 23.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

The invention claimed is:

1. A heating installation (10) for heating one or more objects by infrared (IR) radiation, comprising:
a reflective device (20) made of at least one block of at least one heat-conductive material and defining a plurality of elongated and opened cavities having surfaces able to reflect at least a part of IR spectrum, said opened cavities each defining an aperture, said opened cavities stacked one onto the other according to a stacking axis and arranged to lodge elongated lamps within, where the aperture of each cavity faces generally a main axis parallel to the stacking axis along which the object to be heated is placed, wherein the reflective device further comprises protrusions separating the cavities from one another, and wherein at least one cavity comprises:
a curved bottom portion (23a); and
two opposite side surfaces (23b), the curved bottom portion (23a) joining each of the two opposite side surfaces at a respective longitudinal break of slope,
wherein, at each break of slope of said cavity: an angle ($\theta$) of the corresponding side surface with respect to the median plane (P) of the cavity is lower than the angle of the tangent of the curved bottom portion with respect to this median plane.

2. The heating installation of claim 1, wherein the angle ($\theta$) of at least one side surface with respect to the median plane, at the break of slope, is in the range between 10 and 30°.

3. The heating installation of claim 1, wherein at least one side surface is flat.

4. The heating installation of claim 1, wherein the curved bottom portion is a cylindrical or a parabolic portion, or any intermediate curved portion comprised between cylindrical and parabolic portions.

5. The heating installation of claim 1, wherein each of said integral blocks are molded back reflectors.

6. The heating installation of claim 1, wherein said heat-conductive material is made of a ceramic.

7. The heating installation of claim 1, wherein the interior volume of each cavity has a longitudinal center line (X1, X2, Xi, Xj) along which a IR lamp can be lodged, and wherein the reflective device (20) comprises:
a first end (221) provided with two of said cavities; and
a second end (222) at the opposite of the first end, provided with two of said cavities;
wherein the distance (D1) between the center lines (X1, X2) in the first end is shorter than the distance (Di) between the center lines (Xi, Xj) in the second end.

8. The heating installation according to claim 7, wherein said first end (221) is arranged with a reflecting wall extension (30) that protrudes from the rest of the reflecting device and is adapted to avoid heating of one end of the object to be heated.

9. The heating installation according to claim 1, wherein at least two of the cavities are arranged in a different manner so as to direct radiant output of each lamp around respective main directions that are not parallel.

10. The heating installation according to claim 7, wherein each of said cavities comprises an aperture with a determined width (W) corresponding to the maximum spacing between the two opposite side surfaces (23b), and wherein, for a majority of the cavities, the ratio between the diameter (Dint) of the biggest virtual cylinder that can be lodged in the interior volume of each cavity and said determined width (W) is in the range between 0.6 and 0.9.

11. The heating installation according to claim 1, further comprising a support member (21) having a bottom surface (21a) fixed to the side of the reflective device (20) opposite to said apertures.

12. The heating installation according to claim 10, wherein at least the cavity located at the lowermost level is upwardly inclined so that the main direction of the beam outputting from the cavity through the corresponding aperture is orientated with an angle (α) comprised between 12 and 25° relative to a plane perpendicular to said stacking axis.

13. The heating installation according to claim 10, wherein at least the cavity located at the uppermost level is downwardly inclined so that the main direction of the beam outputting from the cavity through the corresponding aperture is orientated with an angle (β) comprised between 5 and 15° relative to a plane perpendicular to said stacking axis.

14. The heating installation according to claim 1, adapted for use in an oven of a blow molding machine for heating plastic preforms (17) prior to blow molding, the heating installation (10) comprising two elongated lateral walls (14, 15), at least one of which comprises the reflective device (20), the lateral walls facing each other a certain distance apart, between which a preform to be heated can be moved along a defined path, so that the preform moved longitudinally between said lateral walls is subjected to a predetermined heating profile.

15. The heating installation according to claim 1, comprising a plurality of reflector modules (M1, M2) able to be directly stacked according to the stacking axis to integrally form the reflective device (20), each of the reflector modules comprising at least one attachment element on a face that extends transversely relative to the general stacking direction, wherein the attachment elements (27, 28) are adapted to permit removable stacking between two adjacent reflector modules and orientation of the apertures of the reflector modules toward a same side so as to define a continuous reflective face.

16. A reflective module made of at least one thermal conductive material to be stacked with other reflective modules according to a stacking axis so as to form a complete reflective device of a heating installation,
comprising:
at least one elongated and opened cavity having inner surfaces able to reflect at least a part of IR spectrum and arranged to lodge elongated lamps within, wherein the at least one cavity comprises:
a curved bottom portion (23a); and
two opposite side surfaces (23b), the curved bottom (23a) joining each of the two opposite side surfaces at a respective longitudinal break of slope,
wherein, an angle is defined at each break of slope of said cavity and at each break of slope of said cavity the angle of the corresponding side surface with respect to the median plane (P) of the cavity is lower than the angle of the tangent of the curved bottom portion with respect to this median plane.

17. A process for heating plastic preforms, comprising:
positioning the preform along a first axis;
directing radiation from a plurality of elongated lamps onto the preform, each of said plurality of elongated lamps located with a respective elongated and opened cavity defined in a reflective device, with said opened cavities each defining an aperture, and with said opened cavities stacked one onto the other according to a stacking axis, where the aperture of each cavity faces the first axis, and where said stacking axis is parallel to the first axis, and wherein at least two of said cavities each comprises:
a curved bottom portion, and
two opposite side surfaces, the curved bottom portion joining each of the two opposite side surfaces at a respective longitudinal break of slope,
wherein, at each break of slope of each said cavity, an angle of the corresponding side surface with respect to a median plane of the cavity is lower than the angle of the tangent of the curved bottom portion with respect to this median plane, and wherein the interior volume of each opened cavity has a longitudinal center line (X1, X2, Xi, Xj) along which an IR lamp can be lodged, and wherein the reflective device comprises:
a first end (221) provided with two of said cavities; and
a second end (222) at the opposite of the first end, provided with two of said cavities;
wherein the distance (D1) between the center lines (X1, X2) in the first end is shorter than the distance (Di) between the center lines (Xi, Xj) in the second end so as to direct radiant output of each lamp of the first end around respective main directions that are not parallel to radiant output of each lamp of the second end.

18. The method of claim 17, wherein at least the cavity located at the first end is upwardly inclined so that the main direction of the beam outputting from the cavity through the corresponding aperture is orientated with an angle (α) comprised between 12 and 25° relative to a plane perpendicular to said stacking axis.

19. The method of claim 17, wherein at least the cavity located at the second end level is downwardly inclined so that the main direction of the beam outputting from the cavity through the corresponding aperture is orientated with an angle (β) comprised between 5 and 15° relative to a plane perpendicular to said stacking axis.

* * * * *